March 8, 1949.  J. W. SCHULTZ  2,463,648
CAMERA HEAD FOR TRIPODS
Filed Nov. 26, 1946
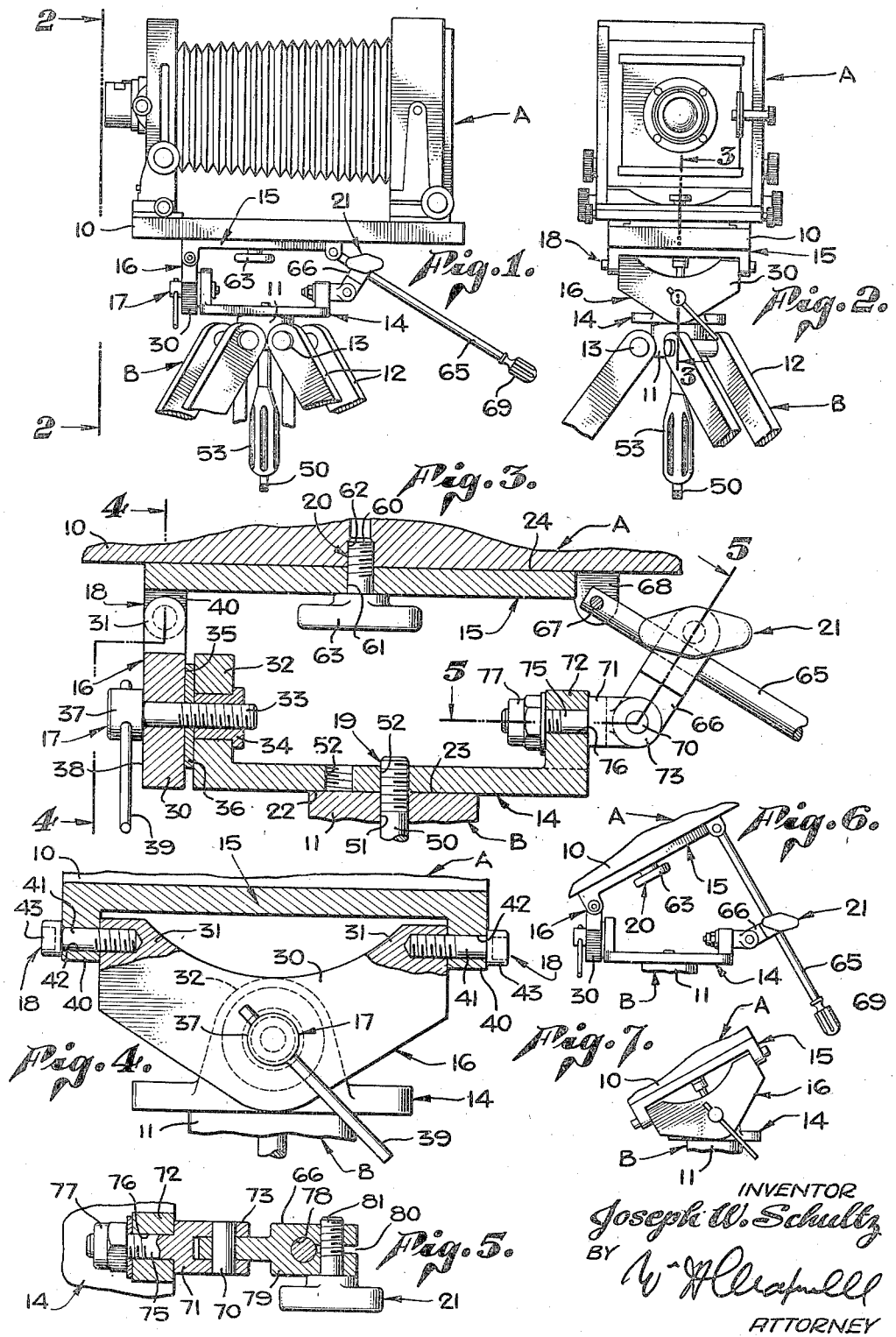
INVENTOR
Joseph W. Schultz
BY
ATTORNEY Patented Mar. 8, 1949

2,463,648

UNITED STATES PATENT OFFICE 2,463,648

CAMERA HEAD FOR TRIPODS

Joseph W. Schultz, Culver City, Calif.

Application November 26, 1946, Serial No. 712,305

12 Claims. (Cl. 248—177)

This invention relates to a camera head for a tripod, that is, to a head applicable to a tripod to carry a camera or the like, and it is a general object of the invention to provide a simple, practical, compact and inexpensive head serving to effectively mount a camera on a tripod for universal adjustment. My present invention is concerned, generally, with a head applicable to a tripod and adapted to carry a camera so the camera is supported for adjustment to various angles or positions relative to the tripod and it is particularly useful and practical for supporting cameras of the type ordinarily referred to as studio cameras, since it is frequently necessary to pitch or adjust such cameras to various angles and it is important that they be held firmly during operation or exposure.

A general object of the present invention is to provide a camera head for adjustably supporting a camera on a tripod, which head is not only adjustable in various directions to, in effect, carry the camera for universal adjustment or movement, but is such that such adjustments or movements can be made quickly and with little effort.

Another object of the present invention is to provide a head of the character referred to involving a minimum number of simple, practical, dependable parts. The head construction that I have provided involves, primarily, but three principal parts, namely, a base plate, a head plate, and a coupler equipped with suitable pivotal connections and with an operating means for tilting one plate relative to the other.

It is another object of the present invention to provide a head of the general character referred to involving a simple, practical, easily operated adjusting means or operating means whereby the head plate is adjustable or tiltable relative to the base plate.

The various objects and features of my invention will be fully understood from the following detailed description of a typical preferred form and application of the invention, throughout which description reference is made to the accompanying drawings, in which:

Fig. 1 is a side elevation of the head provided by the present invention showing it applied to a typical tripod and carrying a typical camera. Fig. 2 is a front view of the structure shown in Fig. 1, being a view taken as indicated by line 2—2 on Fig. 1. Fig. 3 is an enlarged detailed sectional view taken as indicated by line 3—3 on Fig. 2. Fig. 4 is a transverse, sectional view taken as indicated by line 4—4 on Fig. 3. Fig. 5 is a sectional view taken as indicated by line 5—5 on Fig. 3. Fig. 6 is a reduced side elevation of the parts shown in Fig. 3, showing the mechanism in another position, and Fig. 7 is a reduced view of the parts illustrated in Fig. 4, showing those parts in a different position.

The head of the present invention is applicable to any ordinary tripod such as is intended for carrying a camera or the like, and broadly, it may be used to mount or support any suitable camera. In the drawings I have shown the camera A as a typical studio camera including a bed plate 10 applicable to the head that I have provided and which, in turn, is carried by the tripod B. The particular tripod illustrated involves a center or frame member 11 to which a plurality of legs 12 are coupled by suitable pivot pins 13.

The head that I have provided involves two plates, one a base plate 14, the other a head plate 15, a coupler 16, means 17 pivotally connecting the coupler and base plate, means 18 pivotally connecting the coupler and the head plate, means 19 retaining the base plate on the frame of the tripod, means 20 retaining the camera on the head plate, and means 21 for operating the head plate relative to the base plate.

The base plate 14 is applicable to the frame 11 of the tripod and in the preferred form of the invention it is a simple flat plate with a bottom 22 finished to rest upon the top 23 of the tripod frame. The base plate 14 may be varied widely in size, form and configuration so long as it properly carries or accommodates elements of the means 17 and 21, as will be hereinafter described.

The head plate 15 may be a simple flat plate with a finished top face 24 on which the bed 10 of the camera rests. The plate 15, like the plate 14, may be varied widely in form, size and shape so long as it properly carries or accommodates the elements of means 18 and 21, as will be hereinafter described.

The coupler 16 links or joins the plates 14 and 15 through the pivotal connections 17 and 18. In the preferred form of the invention as illustrated in the drawings the coupler 16 is a yoke-shaped member having a body or web portion 30 connected to the base plate 14 by the means 17 and having spaced upwardly projecting arm portions 31 connected to the head plate 15 by the means 18.

The means 17 pivotally connecting the coupler 16 with the base plate 14 couples these parts or elements on a pivotal axis which is normal or at right angles to and intersecting the axis of the means 19 which retains the plate 14 on the frame of the tripod. When the parts are in the normal or usual position such as is shown in Figs. 1, 2, 3 and 4 of the drawings, the frame of the tripod is positioned so that the axis of means 19 is perpendicular, in which case the axis of means 17 is horizontal. I prefer to locate the axis of the means 17 at right angles to that of means 19 and also somewhat above the base plate 14.

The form of means 17 illustrated in the drawings involves an upstanding lug 32 on the base plate 14 and a clamp screw 33 carried by the body of the coupler 16 and having threaded connection with the lug. The lug 32 is shown located at the outer edge portion or margin of the plate 14 and the screw 33 which is rotatably carried by the coupler is shown threaded into a nut 34 made fast in the lug 32 to be, in effect, a part thereof. The lug 32 is located opposite or adjacent what I will term the inner side 35 of the coupler body 30. I prefer to provide a friction washer 36 on the screw 33 between the body 30 and the lug 32. A head 37 is provided on the screw 33 at the outer side 38 of the body 30 and I prefer to provide the head 37 with an operating handle 39 which projects a substantial distance therefrom so the screw can be conveniently operated. When the screw is loosened the coupler 16 can be easily or freely rotated relative to the base plate 14 about the axis of the screw and, in practice, it will be apparent that the parts that I have thus far described can be proportioned and related so that the couples 16 can be rotated through a wide angle about the axis of the screw 33. When the coupler 16 is in the desired position it can be set against movement by merely tightening the screw through suitable manipulation of the handle 39.

The pivotal connecting means 18 which connects the coupler 16 and the head 15 involves depending lugs 40 on the head plate 15 and pivot pins 41 connecting the lugs 40 and the arms 31 of the coupler. The lugs 40 preferably depend from the edge or marginal portions of the plate 15 and are so located that the plate 15 is carried above or in a position to overlie the plate 14 as I have shown in the drawings. The pivot pins 41 that I have shown are made fast in the arms 31 of the coupler and rotate in the openings 42 provided in the lugs 40. The pivot pins may be threaded into the arms 31 in which case they are in the nature of screw members with heads 43 at the outer sides of the lugs 40. In the preferred arrangement of parts as shown in the drawings the coupler fits between the spaced lugs 40.

The two pivot pins 41 are co-axial and the axis of the pins or the axis of pivotal connection between the coupler and head plate is normal or at right angles to that of means 17. In the preferred arrangement of parts the axis of means 18 is located somewhat above the axis of means 17. In fact it is located between the plate 15 and the means 17 and is horizontal when the parts are in the normal unactuated position shown in Figs. 1, 2, 3 and 4 of the drawings. It will be apparent, however that when the coupler 16 is operated to a tilted position such as is shown in Fig. 7 the axis of means 18 is correspondingly tilted.

The means 19 retaining the base plate 14 on the frame 11 of the tripod is preferably a screw means involving, generally, a screw member 50 passing upwardly through a central vertical opening 51 in the frame 11 and coupled or connected to the base plate 14. I prefer to thread the screw member 50 into an opening 52 provided in the base plate 14 to register with the opening 51. In practice I may provide a plurality of openings 52, and as shown in the drawings I have provided two such openings so as to allow variations in position of the head of the present invention on the tripod frame. The screw member 50 depends from the frame member 11 of the tripod and a hand nut 53 is threaded on the member 50 below the frame so that it can be clamped against the bottom of the frame member. When the hand nut 53 is loosened the base plate 14 can be freely turned or rotated to any desired rotative position on or relative to the frame 11. When the base plate 14 is in the desired rotative position relative to the frame member 11 it can be set in that position by tightening the hand nut 53 on the screw member 50.

The camera retaining means 20 is preferably a screw means and in the form illustrated it involves a screw 60 passing up through an opening 61 in the head plate 15 and coupled to the bed 10 of the camera A. I have shown the screw 60 threaded into an opening 62 in the bed of the camera and I have shown the screw provided with a handle 63 at the under side of plate 15 which handle can be conveniently operated by the hand of the operator. When the screw 60 is loosened the camera can be bodily rotated to any desired position on the head plate 15 and when in the desired position it can be set or made fast by tightening the screw 60.

The operating means 21 provided for operating the head plate 15 relative to the base plate 14 is a lever or link mechanism connecting the plates at a point removed from the means 18, which link or lever mechanism is adjustable to vary the spacing or angular positioning of the head plate 15 relative to the base plate 14. In the preferred form of the invention the means 21 involves two levers or arms, one an arm 65 pivotally connected to one plate and the other an arm 66 pivotally connected to the other plate. In the arrangement illustrated the arm 65 is considerably longer than the arm 66, being in the nature of a rod, and has its inner end pivotally connected to plate 15 by a pivot pin 67 carried by spaced lugs 68 projecting from plate 15. A suitable handle 69 is provided on the outer end of the rod which forms the arm 65.

The arm 66 is coupled or connected to the base plate 14 by means of a rotatable pivotal connection which involves a pivot pin 70 pivotally connecting the inner end of arm 66 to a pivot block 71 which, in turn, is pivotally connected to an upstanding lug 72 on the plate 14. The lug 72 is preferably located at the margin or peripheral edge portion of plate 14. The pivot block 71 has spaced ears 73 receiving the arm 66 and carrying the pivot pin 70. A threaded stud 75 projects from the block 71 and is rotatably carried in an opening 76 provided in the lug 72. A nut or retaining means 77 is provided on the projecting end of the threaded stud 75. The nut 77 may be a friction nut engaging the stud 75 so that it will not become displaced therefrom, in which case the nut retains the stud in proper engagement with the lug 72, allowing for free rotation of the stud and consequently the block 71 relative to the lug 72.

In accordance with my invention the axis of the stud 75 is coincidental with that of the pivotal connection 17, that is, the stud 75 is coaxial with the screw 33 and is located diametrically opposite the pivotal connection 17 so that the pivotal axis of the stud 75 and the connection 17 intersects the pivotal axis of means 19. Thus, the means 21 does not in any way interfere with free turning or rocking of the head 15 about the pivotal connection 17.

A sliding connection is provided between the outer end of arm 66 and the arm 65. The arm 65 being in the form of a rod is preferably round in cross section and is slidably carried in an opening 78 provided in the enlarged outer end portion 79 of arm 66. I provide means for setting or clamping the arm 65 against movement relative to arm 66. For this purpose the enlarged end 79 of arm 66 is split at 80 and a clamp screw 81 is carried by the split portion of the part 79. By tightening the clamp screw 81 the arm 65 is gripped so that it will not slide relative to the arms 66.

From an examination of Figs. 1 and 6 of the drawings it will be apparent how the means 21 can be operated when the clamp screw 81 is released so that the head plate 15 is moved to various angles relative to the base plate 16 about the pivotal axis 18. By properly proportioning the parts and by making the arm 65 of substantial length the plate 15 can be moved through a very wide angle relative to the base plate 14. It will be apparent that as the arm 65 is operated as by engaging handle 69 to move the plate 15 to different angles relative to plate 14, the arm 66 varies or pivots about the pin 70. Furthermore, it will be apparent that by having established screw 33 of means 17 and the stud 75 of means 21 on a common axis I am able to tilt the head plate 15 about the pivotal connecting means 17 when the head plate 15 is adjusted to any desired position about the pivotal axis 18.

In using the structure that I have provided the base plate 14 is ordinarily applied to the frame of the tripod in any convenient rotative position and the camera is applied to the head plate 15 so that it is secure or firmly held thereon and faces away from the side of the head mechanism from which the arm 65 projects, thus locating the handle 69 of the arm 65 at the rear or plate end of the camera. In setting the camera to take a picture it can be bodily rocked to either side about the pivotal axis of means 17 and it can be pitched to face up or down at any desired angle by adjustment of the plate 15 about the axis of means 18. Ordinarily in most instances it is desired to face the camera downward somewhat at an angle rather than upward and this can be readily accomplished when the camera is set on the head in the manner illustrated in the drawings. If it is desired to face the camera upward rather than downward or horizontally it is a simple matter to rotate it on the head 15 to a position where it faces from the side of the head at which the lever 65 is located.

When the camera has been faced or positioned at the desired angle it can be made secure or may be firmly set for exposure by tightening the screw 33 of means 17 and the screw 81 of means 21, the means 19 and 20 having been initially set so that the connections between the head and the camera are tight.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A camera head for a tripod including, two plates one a base plate applicable to the tripod and the other a head plate for carrying the camera, a coupler pivotally connected to each plate, and operating means operable to tilt the head plate relative to the base plate including two members one pivotally connected to the base and the other pivotally connected to the head and means slidably pivotally connecting said members one to the other.

2. A camera head for a tripod including, two plates one a base plate applicable to the tripod and the other a head plate for carrying the camera, a yoke shaped coupler pivotally connected to each plate, and operating means operable to tilt the head plate relative to the base plate.

3. A camera head for a tripod including, two plates one a base plate applicable to the tripod and the other a head plate for carrying the camera, a coupler pivotally connected to each plate, and operating means operable to tilt the head plate relative to the base plate including two slidably connected arms, one pivotally connected to one plate and the other pivotally connected to the other plate.

4. A camera head for a tripod including, two plates one a base plate applicable to the tripod and the other a head plate for carrying the camera, a couple pivotally connected to each plate, and operating means operable to tilt the head plate relative to the base plate including two slidably connected arms, one pivotally connected to one plate and the other pivotally connected to the other plate and clamp means operable to set the arms against relative movement.

5. A camera head for a tripod including, two plates, one a base plate the other a head plate, a coupler, means pivotally connecting the coupler and base plate, means pivotally connecting the coupler and the head plate, the axes of said means being in planes at right angles to each other, and means connecting the plates and operable to tilt the head plate about the axis of the first mentioned means including two slidably related arms one pivotally connected to the head plate and the other pivotally coupled to the base plate on an axis coincidental with the axis of said first mentioned means.

6. A camera head for a tripod including, two plates, one a base plate the other a head plate, a coupler, means pivotally connecting the coupler and base plate, means pivotally connecting the coupler and the head plate, the axes of said means being in planes at right angles to each other, and means connecting the plates and operable to tilt the head plate about the axis of the first mentioned means including two slidably related arms one pivotally connected to the head plate and the other pivotally coupled to the base plate on an axis coincidental with the axis of said first mentioned means, and means operable to clamp the arms against relative movement.

7. A camera head for a tripod including, two plates, one a base plate the other a head plate, a coupler, means pivotally connecting the coupler and base plate, means pivotally connecting the coupler and the head plate, the axes of said means being in planes at right angles to each other, and means connecting the plates and operable to tilt the head plate about the axis of the first mentioned means including two slidably related arms one pivotally connected to the head plate and the other pivotally coupled to the base plate on an axis coincidental with the axis of said first mentioned means, one arm being an elongate rod having a handle at its outer end.

8. A camera head for a tripod including, a base plate, means connecting the plate to the tripod on a vertical axis, a head plate, a coupler, means pivotally connecting the coupler to the base plate on a horizontal axis, means pivotally connecting the coupler to the head on an axis in a plane normal to the said horizontal axis, and operating means including a rod, means pivotally connecting the rod to the head, an arm, a block pivotally carried by the base plate on an axis concentric with the said horizontal axis, and means pivotally connecting the arm to said block.

9. A camera head for a tripod including, a base plate, means connecting the plate to the tripod on a vertical axis, a head plate, a coupler, means pivotally connecting the coupler to the base plate on a horizontal axis, means pivotally connecting the coupler to the head on an axis in a plane normal to the said horizontal axis, and operating means including a rod, means pivotally connecting the rod to the head, an arm having a transverse opening slidably carrying the rod, a block pivotally carried by the base plate on the said horizontal axis, and means pivotally connecting the arm to said block.

10. A camera head for a tripod including, a base plate, means connecting the plate to the tripod on a vertical axis, a head plate, a coupler, means pivotally connecting the coupler to the base plate on a horizontal axis, means pivotally connecting the coupler to the head on an axis in a plane normal to the said horizontal axis, and operating means including a rod, means pivotally connecting the rod to the head, an arm having a transverse opening slidably carrying the rod, clamp means operable to set the rod against movement in said opening, a block pivotally carried by the base plate on said horizontal axis, and means pivotally connecting the arm to said block on an axis normal to said horizontal axis.

11. A camera head for a tripod including, a base plate, means connecting the plate to the tripod on a vertical axis, lugs projecting upwardly from the plate at diametrically opposite points relative to said axis, a coupler, means pivotally connecting the coupler to one of the lugs on a transverse axis normal to said vertical axis, a head, means pivotally connecting the coupler and head on an axis in a plane normal to the axis of the said transverse axis, and operating means including two slidably connected arms, one arm being pivotally connected to the head, a block pivotally carrying the other arm and rotatably carried by the other lug on the said transverse axis.

12. A camera head for a tripod including, a base plate, means connecting the plate to the tripod on a vertical axis, lugs projecting upwardly from the plate at diametrically opposite points relative to said axis, a coupler, means pivotally connecting the coupler to one of the lugs on an axis normal to said vertical axis, a head, means pivotally connecting the coupler and head on an axis in a plane normal to the axis of the means connecting the coupler and base, and operating means including two slidably connected arms, one arm being pivotally connected to the head, a block pivotally carrying the other arm and rotatably carried by the other lug on an axis concentric with that of the means connecting the coupler and base, the axis of the connection between said other arm and the block being at right angles to the axis on which the block is carried by the lug.

JOSEPH W. SCHULTZ.

REFERENCES CITED

The following references are of record in the file of this patent:

UNITED STATES PATENTS

| Number | Name | Date |
| --- | --- | --- |
| 439,098 | Blake | Oct. 28, 1890 |
| 622,045 | Hein | Mar. 28, 1899 |
| 803,831 | Krauth | Nov. 7, 1905 |
| 927,894 | Sterling | July 13, 1909 |
| 1,480,651 | Bailey | Jan. 15, 1924 |
| 2,368,192 | Bishop et al. | Jan. 30, 1945 |